United States Patent
Fandem et al.

(10) Patent No.: US 11,616,470 B2
(45) Date of Patent: Mar. 28, 2023

(54) HEATING HEAVY EQUIPMENT

(71) Applicant: Saudi Arabian Oil Company, Dhahran (SA)

(72) Inventors: Qasem A. Fandem, Qatif (SA); Mansour M. Al-Saleh, Al-Hassa (SA); Abdullah A. Al-Khder, Dhahran (SA); Muhammad H. Lutfallah, Al Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 89 days.

(21) Appl. No.: 17/166,926

(22) Filed: Feb. 3, 2021

(65) Prior Publication Data
US 2022/0247350 A1 Aug. 4, 2022

(51) Int. Cl.
*H02S 40/40* (2014.01)
*H05B 6/06* (2006.01)
*H02S 40/38* (2014.01)

(52) U.S. Cl.
CPC .............. *H02S 40/40* (2014.12); *H02S 40/38* (2014.12); *H05B 6/06* (2013.01)

(58) Field of Classification Search
CPC .................................................. H02S 40/00–44
USPC .................................................. 136/243–265
See application file for complete search history.

(56) References Cited

U.S. PATENT DOCUMENTS

| 7,049,557 | B2 | 5/2006 | DeAngelis et al. | |
| 9,164,519 | B2 | 10/2015 | Holloway | |
| 2011/0118896 | A1* | 5/2011 | Holloway | G05B 19/0428 700/90 |
| 2011/0262114 | A1* | 10/2011 | Montgomery | F24F 1/04 62/426 |
| 2017/0108227 | A1* | 4/2017 | Doorandish | F24C 3/042 |

FOREIGN PATENT DOCUMENTS

CN 111270611 * 6/2020

OTHER PUBLICATIONS

CN111270611 English Translation (Year: 2020).*

* cited by examiner

*Primary Examiner* — Bach T Dinh
(74) *Attorney, Agent, or Firm* — Fish & Richardson P.C.

(57) ABSTRACT

A solar panel is electrically coupled to a battery and configured to convert solar energy to electricity to charge the battery. A heating element is electrically coupled to the battery. A thermal sensor is configured to detect an ambient temperature. The thermal sensor is configured to produce a temperature stream indicative of the detected ambient temperature. A humidity sensor is configured to detect an ambient humidity. The humidity sensor is configured to produce a humidity stream indicative of the detected ambient humidity. A controller is electrically couple to the thermal sensor the humidity sensor, and the heating element. The controller is configured to receive a profile that includes an initial designated duration and an initial temperature needed for a designated machine, and produce a current for the heating element to heat the designated machine for the designated duration and temperature.

12 Claims, 5 Drawing Sheets

HEATING HEAVY EQUIPMENT

TECHNICAL FIELD

This disclosure relates to maintain preservation of heavy machinery.

BACKGROUND

For preservation of machinery and equipment, steps are sometimes taken to prevent deterioration during periods of extended downtime. Several standards for preservation procedures exist, for example American Petroleum Institute (API) 686. According to this standard, a space heater is connected, energized, and operated until equipment becomes operational. The function of the space heater is to maintain the machine above the dew point of the ambient air to prevent condensation of moisture and hence prevent damage to the equipment, for example, damage to windings of an electric machine. For static equipment, such as pressure vessels, the equipment is similarly preserved from condensation to prevent corrosion damage.

SUMMARY

This disclosure describes technologies relating to heating heavy equipment.

An example implementation of the subject matter described within this disclosure is a portable heating system with the following features. A solar panel is electrically coupled to a battery and configured to convert solar energy to electricity to charge the battery. A heating element is electrically coupled to the battery. A thermal sensor is configured to detect an ambient temperature. The thermal sensor is configured to produce a temperature stream indicative of the detected ambient temperature. A humidity sensor is configured to detect an ambient humidity. The humidity sensor is configured to produce a humidity stream indicative of the detected ambient humidity. A controller is electrically couple to the thermal sensor the humidity sensor, and the heating element. The controller is configured to receive a profile that includes an initial designated duration and an initial temperature needed for a designated machine, and produce a current for the heating element to heat the designated machine for the designated duration and temperature.

Aspects of the example portable heating system, which can be combined with the example portable heating system alone or in combination with other aspects, include the following. The portable heater can include a height-adjustable base.

Aspects of the example portable heating system, which can be combined with the example portable heating system alone or in combination with other aspects, include the following. The controller is further configured to adjust the height of the portable heating system by the height-adjustable base.

Aspects of the example portable heating system, which can be combined with the example portable heating system alone or in combination with other aspects, include the following. The designated temperature is an initial designated temperature, the designated duration is an initial designated duration. The controller is further configured to receive the temperature stream from the thermal sensor. The controller is further configured to receive the humidity stream from the humidity sensor. The controller is further configured to determine an adjusted duration based on the received temperature stream, the received humidity stream, and the initial duration. The controller is further configured to determine an adjusted temperature based on the received temperature stream, the received humidity stream, and the initial temperature. The controller is further configured to produce a current within the heating element responsive to the adjusted temperature and the adjusted duration.

Aspects of the example portable heating system, which can be combined with the example portable heating system alone or in combination with other aspects, include the following. The adjusted duration is different from the initial duration.

Aspects of the example portable heating system, which can be combined with the example portable heating system alone or in combination with other aspects, include the following. The controller is further configured to, after recording the completion of the heating, updating information in a database.

Aspects of the example portable heating system, which can be combined with the example portable heating system alone or in combination with other aspects, include the following. The controller is further configured to update a database with data including that the machine was heated and the designated duration and temperature that each machine was heated.

Aspects of the example portable heating system, which can be combined with the example portable heating system alone or in combination with other aspects, include the following. The portable heater includes a DC-AC inverter.

An example implementation of the subject matter described within this disclosure is a method with the following features. A profile is received by a controller. The profile includes an initial designated temperature and an initial duration for a designated machine. An ambient temperature is measured. An ambient humidity is measured. An adjusted temperature and an adjusted duration are determined based upon the ambient temperature and the ambient humidity. The designated machine is heated at the adjusted temperature for the adjusted duration. The completion of heating the designated machine for the adjusted duration at the adjusted temperature is recorded.

Aspects of the example method, which can be combined with the example method alone or in combination with other aspects, include the following. The initial temperature is different from the adjusted temperature.

Aspects of the example method, which can be combined with the example method alone or in combination with other aspects, include the following. The adjusted duration is different from the initial duration.

Aspects of the example method, which can be combined with the example method alone or in combination with other aspects, include the following. After recording the completion of the heating, updating information in a database, by a controller.

Aspects of the example method, which can be combined with the example method alone or in combination with other aspects, include the following. The information includes the designated machine that has been heated, the adjusted temperature and the adjusted duration of the heating, and a date of the heating.

Aspects of the example method, which can be combined with the example method alone or in combination with other aspects, include the following. Updating the information in the database by the controller includes updating the database by a wireless network.

Aspects of the example method, which can be combined with the example method alone or in combination with other aspects, include the following. Updating the information in the database by the controller includes updating the database by a wired connection.

An example implementation of the subject matter described within this disclosure is a preservation system with the following features. A system database includes data about multiple machines. The data includes an initial temperature to heat the machine. The data includes an initial duration to heat each machine. The data includes a frequency to heat each machine. A wireless network couples a controller and the database. The wireless network provides communication between the controller and the database. A portable heating system includes a solar panel electrically coupled to a battery and configured to convert solar energy to electricity to charge the battery. A heating element is electrically coupled to the battery. A thermal sensor is configured to detect an ambient temperature. The thermal sensor is configured to produce a temperature stream indicative of the detected ambient temperature. A humidity sensor is configured to detect an ambient humidity. The humidity sensor is configured to produce a humidity stream indicative of the detected ambient humidity. A controller is electrically coupled to the thermal sensor, the humidity sensor, and the heating element. The e controller is configured to receive the temperature stream from the thermal sensor, receive a humidity stream from the humidity sensor, and produce a current within the heating element responsive to the received temperature stream and the received humidity stream.

Aspects of the example preservation system, which can be combined with the example preservation system alone or with other aspects, include the following. The portable heating system further includes a height-adjustable base.

Aspects of the example preservation system, which can be combined with the example preservation system alone or with other aspects, include the following. The controller is further configured to adjust the height of the portable heating system by the height-adjustable base.

Aspects of the example preservation system, which can be combined with the example preservation system alone or with other aspects, include the following. The controller is further configured to receive a profile comprising a designated duration and temperature needed for a designated machine, and send a current to a heating element to heat one of the machines based on the designated duration, the designated temperature, the received temperature stream, and the received humidity stream.

Aspects of the example preservation system, which can be combined with the example preservation system alone or with other aspects, include the following. The controller is further configured to update a database with data including that the machine was heated and, a duration and temperature that each machine was heated.

Particular implementations of the subject matter described in this disclosure can be implemented so as to realize one or more of the following advantages. The subject matter described herein allows for the preservation of equipment without space heaters at remote locations. The subject matter described within this disclosure has smart and reliable power supply to assure equipment preservation. The subject matter described herein automatically performs preservation activity for all equipment and maintain their permanent preservation record. Throughout this disclosure, the described systems maintain equipment in preservation while the equipment is off during construction or maintenance shutdowns. A clean, reliable, and healthy environmental power source can be used for the systems described herein. The portable external device, described herein, for preservation of machinery and static equipment, is an adaptable device with flexible space heaters where its size and shape can be modified to fit on different equipment shapes and sizes. The portable heater described throughout this disclosure is a moveable device that externally attaches to equipment for preservation purposes. The portable heater can be supported by adjustable base to accommodate different equipment elevations. The systems described throughout this disclosure can be equipped with independent power source and provided with a controller that monitors the preservation parameters.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

For equipment and heavy machinery equipped with internal space heaters, it is common practice to preserve the equipment manually with a power source from diesel generators to energize the internal space heaters while the equipment is down for extended periods of time, such as during construction of a facility; however, not all equipment is manufactured with an internal space heater. Such equipment is at risk of damage of internal components (e.g., windings) due to condensation subsequent corrosion. This practice is not practical as it cannot be applied on equipment lacking internal space heaters. Additionally, it is not effective to preserve equipment at construction sites with fixed internal space heaters as preservation is required for temporary basis until equipment becomes fully operational. Moreover, the fixed space heater is neither portable, where it cannot be utilized for other equipment, nor flexible to fit different equipment types and sizes. The common preservation practice is completely a manual process including monitoring the environmental conditions, maintaining the preservation records, and energizing the space heater with diesel generators which are not always available.

This disclosure describes a portable heating system that can be used with a variety of equipment. The heating system includes batteries and solar panels such that the heating system can be used in remote locations. The heating system includes flexible heating elements that can be manipulated to fit on or within a variety of equipment types. The heating system also includes a controller that can regulate the temperature of the heating elements and the duration of heating of the heating elements.

Figure 1:
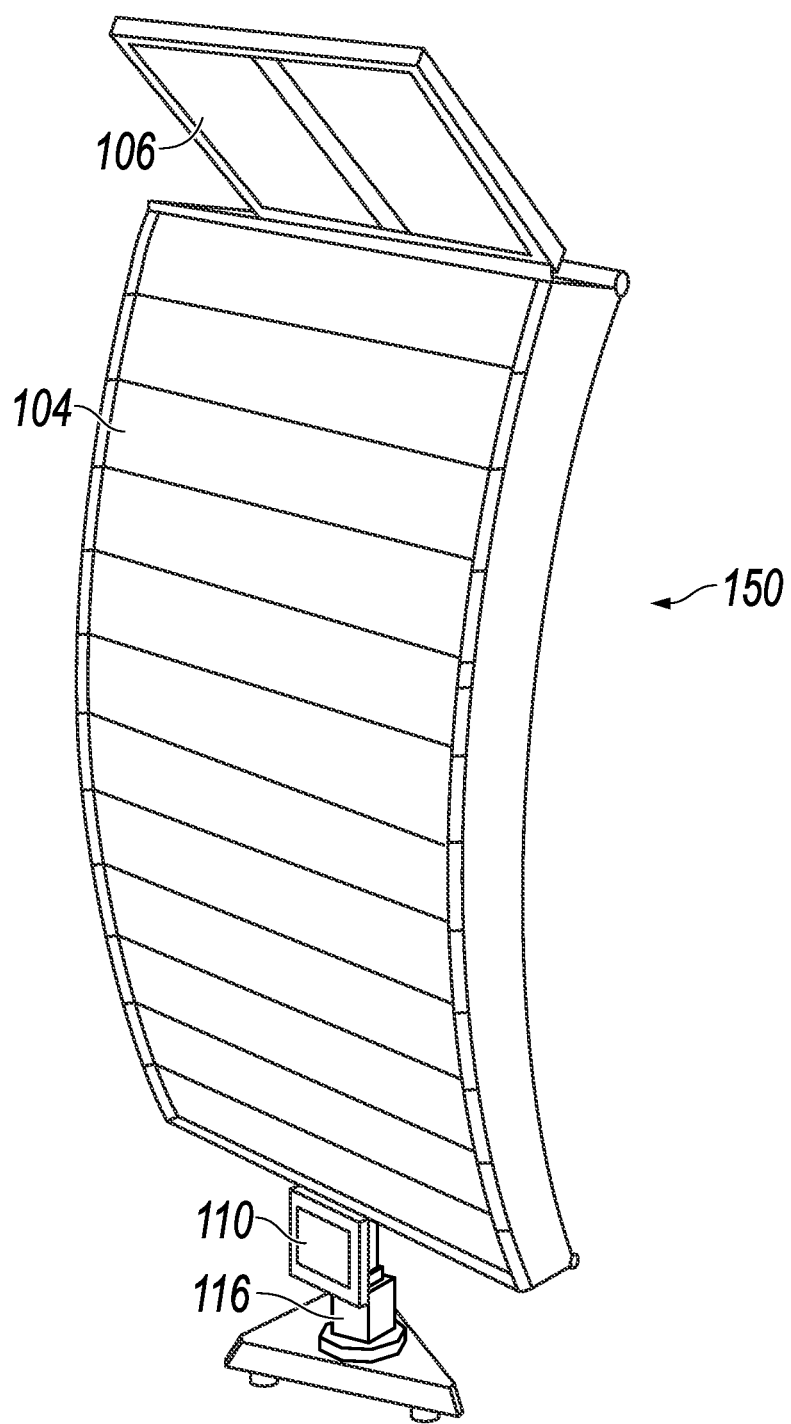
FIG. 1 is a perspective view of an example portable heating system.
Figure 2:
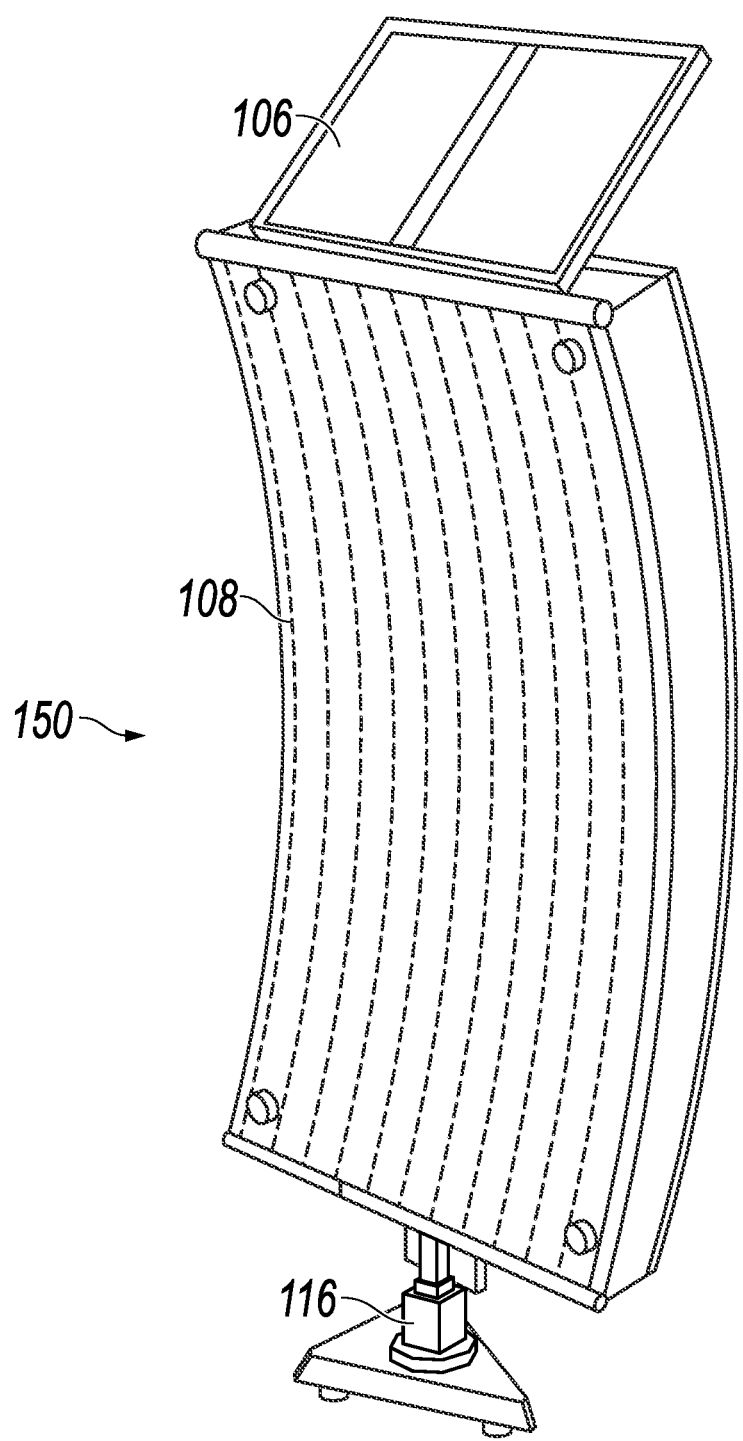
FIG. 2 is a perspective view of the example portable heating system.
Figure 3:
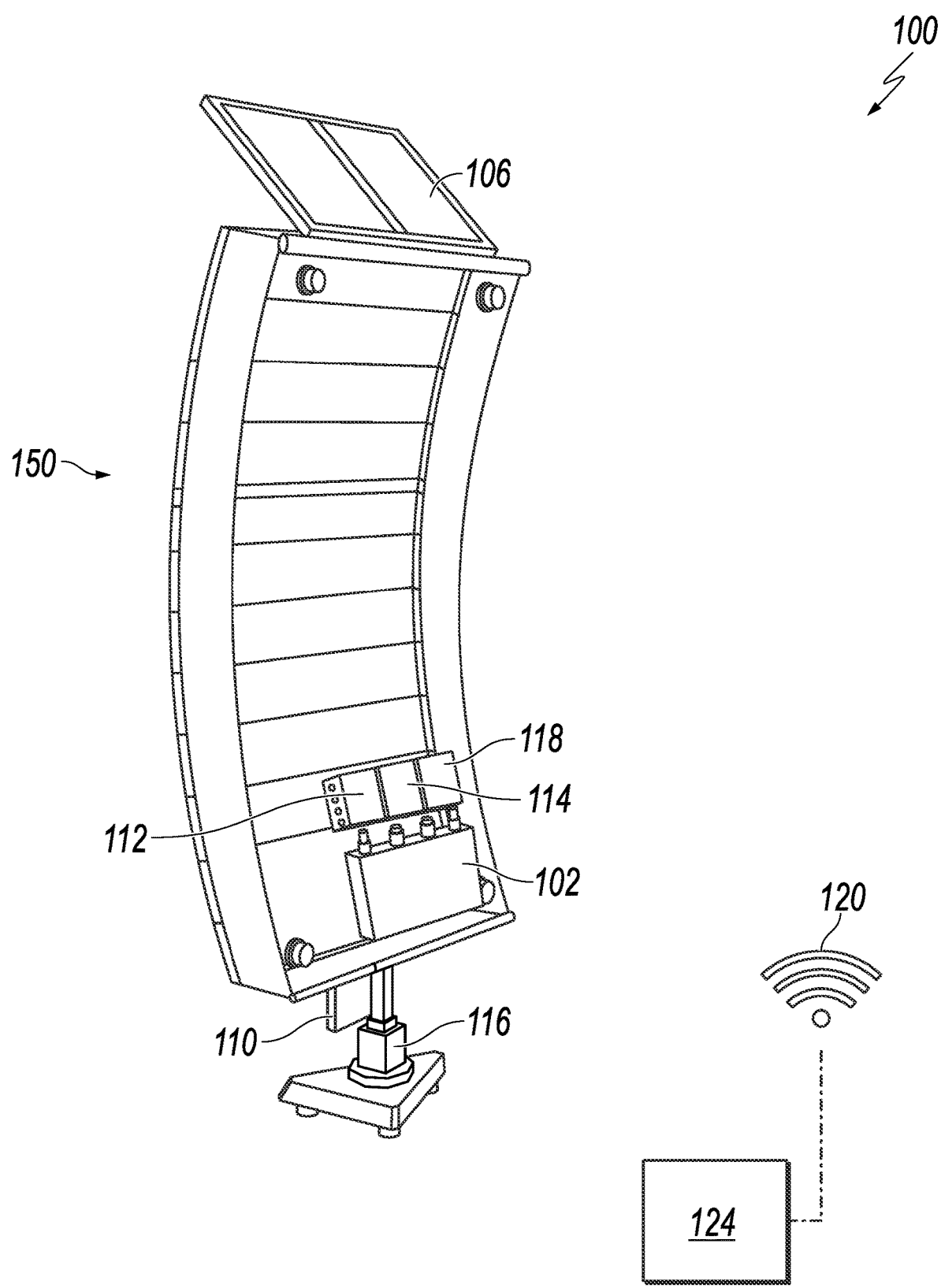
FIG. 3 is a perspective view of the example portable heating system with a panel removed.

FIGS. 1-3 are perspective views of an example portable heating system 100. FIG. 3 is a perspective view of the example portable heating system 100 with a panel removed.

The portable heating system includes a portable heater 150 with a battery 102. While primarily described as being battery powered, other power storage systems, such as super capacitors, can be used without departing from this disclosure. A solar panel 104 is configured to convert solar energy to electricity to charge the battery 102. The solar panel 104 can be curved along a convex surface of the portable heater 150. In some implementations, an additional auxiliary solar panel 106 can be included. The solar panels 104 and 106 allow for the battery 102 to be charged such that the portable heater 150 can be used in areas lacking sufficient power infrastructure to power such equipment.

A heating element 108 is electrically coupled to the battery 102 and a controller 110. In some implementations, the heating element is a conductive heating element. In some implementations, the heating element is an inductive heating element. The heating element is attached to a flexible resilient substrate that can be inserted into a piece of machinery or laid atop a piece of machinery. In some implementations, the substrate and heating element 108 combination can be folded without causing permanent deformation (for example, creasing) within the substrate or heating element. While primarily illustrated as being attached to the portable heater 150, the heating element 108 can be removed from the portable heater 150 and can be powered by cables connected to the portable heater 150.

One or more sensors can be included with the portable heater 150. For example, a thermal sensor 112 configured to detect an ambient temperature can be included. The thermal sensor 112 is configured to produce a temperature stream indicative of the detected ambient temperature. Alternatively or in addition, a humidity sensor 114 can be included with the portable heater 150. The humidity sensor 114 is configured to detect an ambient humidity. The humidity sensor 114 is configured to produce a humidity stream indicative of the detected ambient humidity. The humidity stream, the temperature stream, or any other sensor stream, can include electrical signals, digital or analog, that can be received and interpreted by the controller 110 to determine an ambient condition, such as the ambient temperature and ambient humidity. In some implementations, pneumatic, hydraulic, or wireless signals can be used for signal streams without departing from this disclosure.

In some implementations, the portable heater 150 can include a height adjustable base 116. The height adjustable base 116 can include one or more linear actuators that can be manual, electric, hydraulic, or pneumatic. The height adjustable base 116 can be controlled by the controller 110 or by an operator. The height adjustable base 116 allows the portable heater 150 to be used with equipment at a variety of elevations.

FIG. 3 is a perspective view of the example portable heater 150 with the heating coil 108 and the substrate removed. The portable heater 150 includes the battery 102 nearer a bottom of the portable heater 150 for more stable weight distribution. Near the battery 102 is a DC-AC inverter 118. The DC-AC inverter can be used in implementations where the heating element is an inductive heating element, or in instances where the controller 110, adjustable base 116, or both, are powered by AC power.

The controller 110 is electrically coupled to the batteries 102, the solar panel 104, (and 106), the heating element 108, and the sensors 112 and 114. The controller 110 is configured for network connectivity through either a wireless network 120 or a wired network. Such connectivity allows the controller to communicate with a system database 124. The system database 124 can include data about machines that the portable heater 150 can be used to heat. Such data can include an initial temperature and an initial duration to heat the machine. The data can also include a frequency to heat each machine, that is, how often each machine should be heated. Such data can be saved into a profile that can be uploaded to the controller 110 prior to heating operations. In some implementations, the controller can be plugged into a node of a network, such as a networked computer, so that the data and information can be exchanged between the controller 110 and the database 124 by a wired connection.

In some instances, the designated temperature is an initial designated temperature, and the designated duration is an initial designated duration. That is, the profile can include a baseline temperature and duration for the machine to be heated. In certain instances, ambient conditions can affect the temperature and duration needed to fully ensure dryness of the machine. For such instances, the controller is configured to receive the temperature and humidity stream from the thermal sensor 112 and the humidity sensor 114 respectively. The controller can then determine an adjusted duration and temperature based on the received temperature stream, the received humidity stream, and the baseline temperature and duration. For example, an adjusted duration, temperature, or both may be increased in humid environments. In some instances, an adjusted temperature, duration, or both may be decreased in dryer conditions. Regardless of whether there is an increase or decrease in either the temperature or the duration, the adjusted duration, adjusted temperature, or both may be different from the initial duration and temperature based on the received profile.

Once an adjusted duration and temperature has been calculated, the controller can then produce a current within the heating element responsive to the adjusted temperature and the adjusted duration. After recording the completion of the heating, the controller is further configured to update information in a database as previously described.

Figure 4:
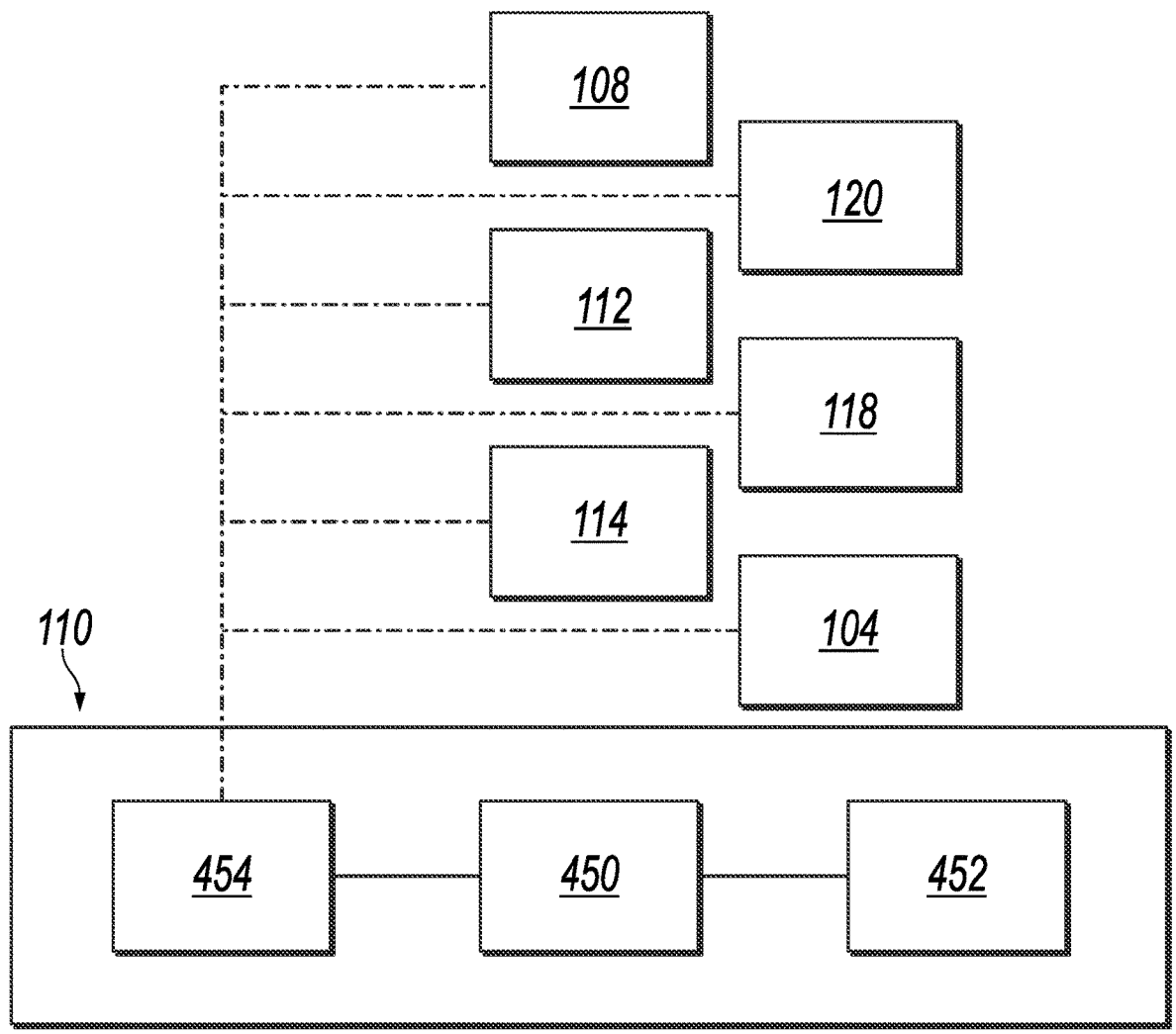
FIG. 4 is a block diagram of an example controller that can be used with aspects of this disclosure.

FIG. 4 is a block diagram of an example controller 110 that can be used with aspects of this disclosure. The controller 110 can, among other things, monitor parameters of the portable heater 150 and send signals to actuate and/or adjust various operating parameters of the portable heater 150. As shown in FIG. 4, the controller 110, in certain instances, includes a processor 450 (e.g., implemented as one processor or multiple processors) and a memory 452 (e.g., implemented as one memory or multiple memories) containing instructions that cause the processors 450 to perform operations described herein. The processors 450 are coupled to an input/output (I/O) interface 454 for sending and receiving communications with components in the system, including, for example, the heating element 108. In certain instances, the controller 110 can additionally communicate status with and send actuation and/or control signals to one or more of the various system components (including an actuator system, such as the height adjustable base 116) of the portable heater 150, as well as other sensors (for example, a current sensor, thermal sensor 112, humidity sensor 114, and other types of sensors) provided in the portable heater 150. In certain instances, the controller 110 can communicate status and send actuation and control signals to one or more of the components within the portable heater 150, such as the heating element 108. The communications can be hard-wired, wireless, or a combination of wired and wireless. In some implementations, controllers similar to the controller 110 can be located elsewhere, such as in a control room, elsewhere on a site, or even remote from the site. In some implementations, the controller 110 can be a distributed controller with different portions located on the portable heater 150, about a site, or off site. Additional controllers can be used throughout the site as stand-alone controllers or networked controllers without departing from this disclosure.

The controller 110 can have varying levels of autonomy for controlling the portable heater 150. For example, the controller 110 can receive the route from the system database 124 (FIG. 3), and an operator manually controls a temperature and duration of heating based on the information displayed by the controller 110. Alternatively, the controller 110 can receive the route from the system database 124, receive an additional input from an operator, and begin heating the piece of equipment to a set temperature for a set duration of time with no other input from an operator.

Figure 5:
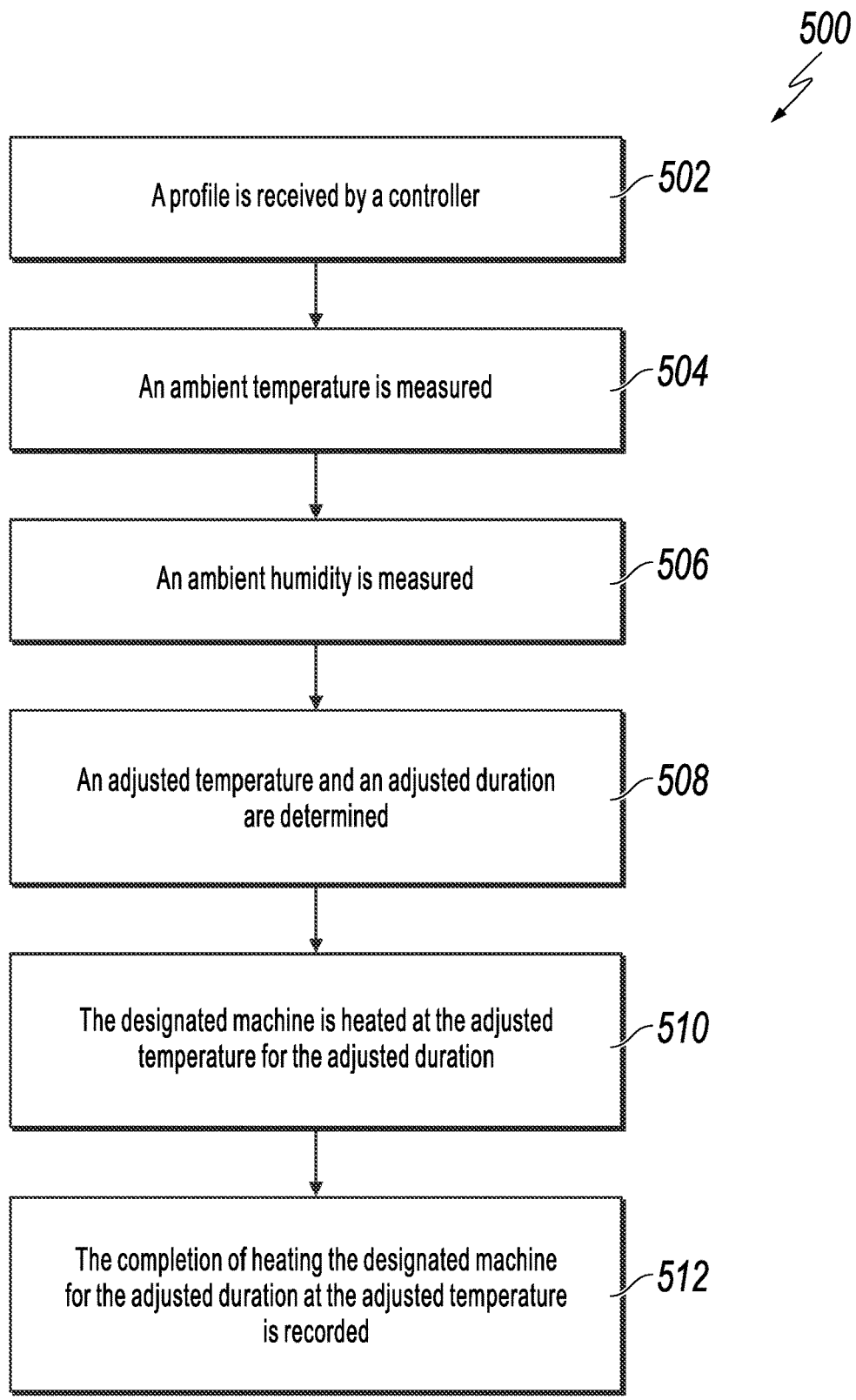
FIG. 5 is a flowchart of an example method that can be used with aspects of this disclosure.

FIG. 5 is a flowchart of an example method 500 that can be used with aspects of this disclosure. In some implementations, parts or the entirety of the method 500 can be performed by the controller 110. At 502, a profile is received by a controller. The profile includes an initial designated temperature and an initial duration for a designated machine to be heated by the portable heater 150. At 504, an ambient temperature is measured. At 506, an ambient humidity is measured. At 508, an adjusted temperature and an adjusted duration are determined based upon the ambient temperature and the ambient humidity, the initial temperature, and the initial duration. In some instances, the initial temperature is different from the adjusted temperature. In some instances, the adjusted duration is different from the initial duration.

At 510, the designated machine is heated at the adjusted temperature for the adjusted duration. At 512, the completion of heating the designated machine for the adjusted duration at the adjusted temperature is recorded. After recording the completion of the heating, information in a database is updated by the controller. In some implementations, updating the information in the database by the controller includes updating the database by a wireless network. The information can include the designated machine that has been heated, the adjusted temperature and the adjusted duration of the heating, a date of the heating, or a combination.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. A portable heating system comprising:
a battery;
a solar panel electrically couple to the battery and configured to convert solar energy to electricity to charge the battery;
a heating element electrically coupled to the battery;
a thermal sensor configured to detect an ambient temperature, the thermal sensor configured to produce a temperature stream indicative of the detected ambient temperature;
a humidity sensor configured to detect an ambient humidity, the humidity sensor configured to produce a humidity stream indicative of the detected ambient humidity; and
a controller electrically couple to the thermal sensor the humidity sensor, and the heating element, the controller configured to:
receive a profile comprising an initial designated duration and an initial temperature needed for a designated machine;
produce a current for the heating element to heat the designated machine for the designated duration and temperature;
receive the temperature stream from the thermal sensor;
receive the humidity stream from the humidity sensor;
determine an adjusted duration based on the received temperature stream, the received humidity stream, and the initial duration;
determine an adjusted temperature based on the received temperature stream, the received humidity stream, and the initial temperature; and
produce a current within the heating element responsive to the adjusted temperature and the adjusted duration.

2. The portable heating system of claim 1, further comprising a height-adjustable base.

3. The portable heating system of claim 2, wherein the controller is further configured to adjust the height of the portable heating system by the height-adjustable base.

4. The portable heating system of claim 1, wherein the adjusted duration is different from the initial duration.

5. The portable heating system of claim 1, wherein the controller is further configured to, after recording the completion of the heating, updating information in a database.

6. The portable heating system of claim 1, wherein the controller is further configured to update a database with data including that the machine was heated and the initial designated duration and the initial temperature that each machine was heated.

7. The portable heating system of claim 1, further comprising a DC-AC inverter.

8. A preservation system comprising:
system database comprising data about a plurality of machines, the data including:
an initial temperature to heat the machine;
an initial duration to heat each machine; and
frequency to heat each machine;
a wireless network coupling a controller and the database, the wireless network providing communication between the controller and the database; and
a portable heating system comprising:
a battery;
a solar panel electrically coupled to the battery and configured to convert solar energy to electricity to charge the battery;
a heating element electrically coupled to the battery;
a thermal sensor configured to detect an ambient temperature, the thermal sensor configured to produce a temperature stream indicative of the detected ambient temperature;
a humidity sensor configured to detect an ambient humidity, the humidity sensor configured to produce a humidity stream indicative of the detected ambient humidity; and
a controller electrically coupled to the thermal sensor, the humidity sensor, and the heating element, the controller configured to:
receive the temperature stream from the thermal sensor;
receive the humidity stream from the humidity sensor;
produce a current within the heating element responsive to the received temperature stream and the received humidity stream
determine an adjusted duration based on the received temperature stream, the received humidity stream, and the initial duration;
determine an adjusted temperature based on the received temperature stream, the received humidity stream, and the initial temperature; and
produce a current within the heating element responsive to the adjusted temperature and the adjusted duration.

9. The preservation system of claim 8, wherein the portable heating system further comprises a height-adjustable base.

10. The preservation system of claim 9, wherein the controller is further configured to adjust the height of the portable heating system by the height-adjustable base.

11. The preservation system of claim 8, wherein the controller is further configured to:
receive a profile comprising a designated duration and temperature needed for a designated machine; and
send a current to a heating element to heat one of the plurality of machines based on the designated duration, the designated temperature, the received temperature stream, and the received humidity stream.

12. The preservation system of claim 8, wherein the controller is further configured to update a database with data including that the machine was heated and, a duration and temperature that each machine was heated.

* * * * *